US012759436B2

(12) United States Patent
Zhang et al.

(10) Patent No.: US 12,759,436 B2
(45) Date of Patent: Oct. 13, 2026

(54) SUPPORT LEG ANTI-PINCH STRUCTURE AND CHILD SAFETY SEAT

(71) Applicant: NINGBO BABY FIRST BABY PRODUCTS CO., LTD., Ningbo (CN)

(72) Inventors: Yeye Zhang, Ningbo (CN); Wenyong Cao, Ningbo (CN)

(73) Assignee: NINGBO BABY FIRST BABY PRODUCTS CO., LTD., Ningbo (CN)

( * ) Notice: Subject to any disclaimer, the term of this patent is extended or adjusted under 35 U.S.C. 154(b) by 112 days.

(21) Appl. No.: 18/969,305

(22) Filed: Dec. 5, 2024

(65) Prior Publication Data

US 2025/0319798 A1 Oct. 16, 2025

(30) Foreign Application Priority Data

Apr. 16, 2024 (CN) ......................... 202420787509.4

(51) Int. Cl.
*B60N 2/28* (2006.01)
*B60N 2/07* (2006.01)

(52) U.S. Cl.
CPC ......... *B60N 2/0725* (2013.01); *B60N 2/2827* (2013.01)

(58) Field of Classification Search
CPC .. B60N 2/0725; B60N 2/2824; B60N 2/2827; A47C 4/22
See application file for complete search history.

(56) References Cited

U.S. PATENT DOCUMENTS

| | | | | |
|---|---|---|---|---|
| 12,485,803 B2 * | 12/2025 | Brenner | ............... | B60N 2/2824 |
| 12,570,189 B2 * | 3/2026 | Mo | ...................... | B60N 2/2821 |
| 12,589,679 B2 * | 3/2026 | Zhang | .................. | B60N 2/2821 |
| 2019/0031052 A1 * | 1/2019 | Pos | ...................... | B60N 2/2824 |
| 2024/0198868 A1 * | 6/2024 | Guo | ..................... | B60N 2/2824 |

FOREIGN PATENT DOCUMENTS

| | | | | |
|---|---|---|---|---|
| CN | 202147605 U * | 2/2012 | ........... | B60N 2/2824 |
| CN | 108045278 A * | 5/2018 | ............... | B60N 2/26 |
| CN | 110281821 A * | 9/2019 | ........... | B60N 2/2824 |

(Continued)

OTHER PUBLICATIONS

English translation for CN-108045278-A (Year: 2018).*

(Continued)

*Primary Examiner* — David R Dunn
*Assistant Examiner* — Troy Alan Libby

(57) ABSTRACT

This disclosure relates to the field of child safety seat technology and discloses a support leg anti-pinch structure and child safety seat. It includes a support leg and support leg cover that are rotatably connected to each other, with a sliding piece movably connected between the support leg cover and the support leg. When the support leg rotates relative to the support leg cover, the sliding piece moves in the front-back direction to cover the rotational gap between the support leg and the support leg cover. Compared to existing technology, the support leg anti-pinch structure of this disclosure prevents users' fingers from being pinched in the gap during rotation due to the presence of a rotational gap between the support leg and support leg cover. The sliding piece covering this gap eliminates the risk of hand pinching during support leg rotation, with a simple structure and low cost.

17 Claims, 6 Drawing Sheets

(56) References Cited

FOREIGN PATENT DOCUMENTS

| | | | | | |
|---|---|---|---|---|---|
| CN | 110435508 | A | * | 11/2019 | B60N 2/90 |
| CN | 111251954 | A | * | 6/2020 | B60N 2/2824 |
| CN | 216139881 | U | * | 3/2022 | B60N 2/28 |
| CN | 114425974 | A | * | 5/2022 | B60N 2/28 |
| CN | 117104094 | A | * | 11/2023 | B60N 2/2824 |
| CN | 117485213 | A | * | 2/2024 | B60N 2/2845 |
| JP | 4898037 | B2 | * | 3/2012 | B60N 2/2824 |

OTHER PUBLICATIONS

English translation for CN-110281821-A (Year: 2019).*
English translation for CN-110435508-A (Year: 2019).*
English translation for CN-111251954-A (Year: 2020).*
English translation for CN-114425974-A (Year: 2022).*
English translation for CN-117104094-A (Year: 2023).*
English translation for CN-117485213-A (Year: 2024).*
English translation for CN-202147605-U (Year: 2012).*
English translation for CN-216139881-U (Year: 2022).*
English translation for JP-4898037-B2 (Year: 2012).*

* cited by examiner

SUPPORT LEG ANTI-PINCH STRUCTURE AND CHILD SAFETY SEAT

CROSS REFERENCE TO RELATED APPLICATIONS

The present application claims the benefit of Chinese Patent Application No. 202420787509.4 filed on Apr. 16, 2024, the contents of which are incorporated herein by reference in their entirety.

TECHNICAL FIELD

This disclosure relates to the field of child safety seat technology, specifically to a support leg anti-pinch structure and child safety seat.

BACKGROUND TECHNOLOGY

Child safety seats are essential items for infants and children traveling in vehicles. To prevent the child safety seat from moving due to inertia during sudden braking and other situations, a support leg is generally set at the front end of the support leg cover, which can also be retracted when not in use. However, in existing support legs, there is a gap between the support leg and the support leg cover during use. When fingers are placed in this gap, they can easily be pinched by the support leg, causing injury.

DISCLOSURE CONTENT

To solve at least one aspect of the above problems, this disclosure first provides a support leg anti-pinch structure, including a support leg and support leg cover rotatably connected to each other, with a sliding piece movably connected between the support leg cover and the support leg. When the support leg rotates relative to the support leg cover, the sliding piece moves in the front-back direction to cover the rotational gap between the support leg and the support leg cover.

Optionally, the support leg cover is provided with a torsion spring, the two ends of the torsion spring are connected to the support leg cover and the sliding piece respectively, and the sliding piece slides relative to the support leg cover under the pressure of the torsion spring and the support leg.

Optionally, the sliding piece is provided with a support column, the support leg cover is provided with a sliding groove that slidably matches with the support column, and the torsion spring abuts against the side of the support column facing away from the support leg.

Optionally, when the support leg switches from the extended state to the retracted state, the sliding piece separates from the front side of the support leg cover under the action of the torsion spring; when the support leg is in the extended state, the sliding piece abuts against the front side of the support leg cover under the pressure of the support leg.

Optionally, the sliding piece is provided with a locking block, the support leg cover is provided with a locking slot, and the locking block is slidably engaged in the locking slot.

Optionally, the support leg cover includes a top cover and a bottom cover, one end of the support leg is embedded inside the bottom cover, the sliding piece is installed at the front end of the bottom cover, and the top cover is covered on top of the bottom cover.

Optionally, the sliding piece is provided with a first guide surface and a second guide surface, the first guide surface matches with the support leg, and the second guide surface matches with the support leg cover.

Optionally, the first guide surface is an arc surface.

Optionally, the sliding piece is embedded inside the support leg cover.

Compared to existing technology, the support leg anti-pinch structure of this disclosure prevents users' fingers from being pinched in the gap during rotation due to the presence of a rotational gap between the support leg and support leg cover. The sliding piece covering this gap eliminates the risk of hand pinching during support leg rotation, with a simple structure and low cost. Moreover, the entire structure has the sliding piece placed inside the support leg cover, making it concealed, without affecting the movement of the support leg or the overall external dimensions, providing users with a good product experience.

Additionally, this disclosure provides a child safety seat that includes the aforementioned support leg anti-pinch structure.

Compared to existing technology, the child safety seat of this disclosure has the same advantages as the aforementioned support leg anti-pinch structure relative to existing technology, which will not be repeated here.

DESCRIPTION OF REFERENCE NUMERALS

Figure 1:
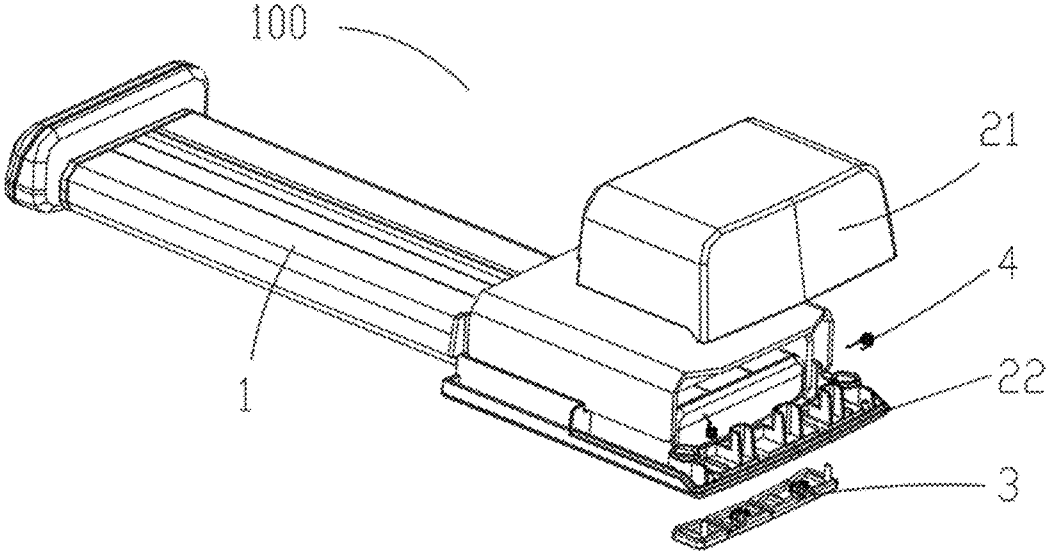
FIG. 1 is an exploded view of the support leg anti-pinch structure in an embodiment of this disclosure.

100—support leg anti-pinch structure; 1—support leg; 2—support leg cover; 21—top cover; 22—bottom cover; 23—sliding groove; 24—locking slot; 3—sliding piece; 31—support column; 32—locking block; 4—torsion spring.

DETAILED DESCRIPTION OF EMBODIMENTS

To make the above objectives, features and advantages of this disclosure more apparent and easier to understand, detailed descriptions of specific embodiments of this disclosure are provided below in conjunction with the figures.

In the description of this disclosure, it should be understood that terms such as "upper" and "lower" indicate directional or positional relationships based on the normal use orientation or position of the product.

The terms "first" and "second" are used only for descriptive purposes and should not be understood as indicating or implying relative importance or implicitly specifying the number of technical features indicated. Thus, features defined as "first" and "second" may explicitly or implicitly include at least one such feature.

This embodiment of the disclosure provides a support leg anti-pinch structure. Referring to the structure and directions shown in FIGS. 1 to 9, it includes a support leg 1 and a support leg cover 2 rotatably connected to each other, with a sliding piece 3 movably connected between the support leg cover 2 and the support leg 1. When the support leg 1 rotates relative to the support leg cover 2, the sliding piece 3 moves in the front-back direction to cover the rotational gap between the support leg 1 and the support leg cover 2. The initial state of the support leg 1 is retracted, and its working state is extended. As shown in FIGS. 2 and 4, in the retracted state, the rotation angle between the support leg 1 and the support leg cover 2 is nearly 0 degrees, while in the working state, the rotation angle is nearly 90 degrees. When the support leg 1 switches between retracted and extended states, it rotates between 0-90 degrees. Due to the rotational gap between the support leg 1 and the support leg cover 2 during rotation, there is a risk of users' fingers getting pinched in this gap. Moreover, when applied to child safety seats, children's active nature makes it easier for them to reach into the rotational gap and get injured. The sliding piece 3 is set to cover the rotational gap, preventing users' fingers from getting pinched in the gap and eliminating the risk of hand pinching during support leg rotation, with a simple structure and low cost.

Figure 2:
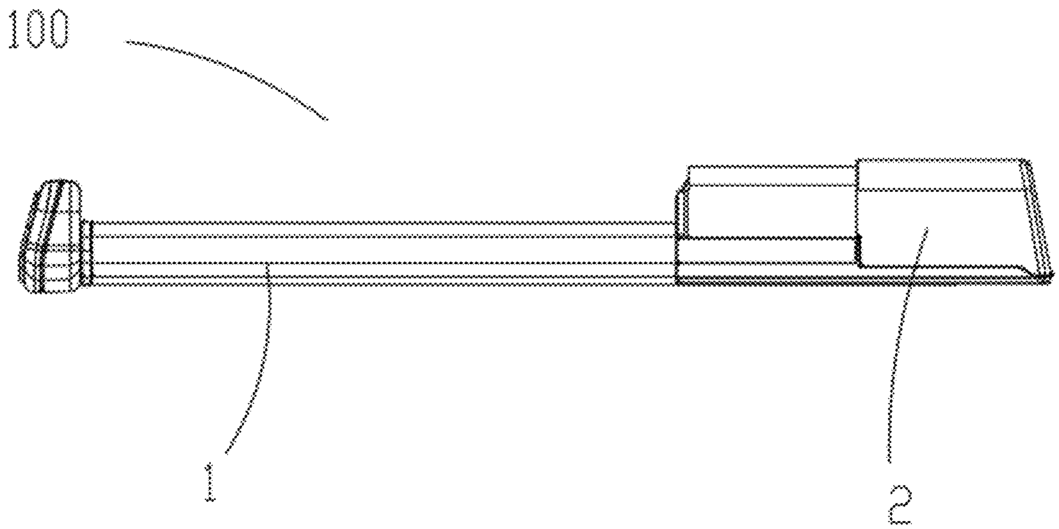
FIG. 2 is a schematic diagram of the support leg in retracted state in an embodiment of this disclosure.

As shown in FIG. 1, the support leg cover 2 is provided with a torsion spring 4, with the two ends of the torsion spring 4 connected to the support leg cover 2 and the sliding piece 3 respectively. The sliding piece 3 slides relative to the support leg cover 2 under the pressure of the torsion spring 4 and the support leg 1. The support leg cover 2 has a fixed axis, and the torsion spring 4 is fitted on this fixed axis. One end of the torsion spring 4 protrudes outward and abuts against the sliding piece 3. When the support leg 1 switches from the extended state to the retracted state, the sliding piece 3 separates from the front side of the support leg cover 2 under the action of the torsion spring 4. When the support leg 1 is in the extended state, the sliding piece 3 abuts against the front side of the support leg cover 2 under the pressure of the support leg 1. Under the force of the torsion spring 4, the sliding piece 3 always follows the support leg 1. As the support leg 1 rotates back and forth, the sliding piece 3 slides back and forth relative to the support leg cover 2. The force of the torsion spring 4 on the sliding piece 3 is opposite to the force of the support leg 1 on the sliding piece 3.

Figure 6:
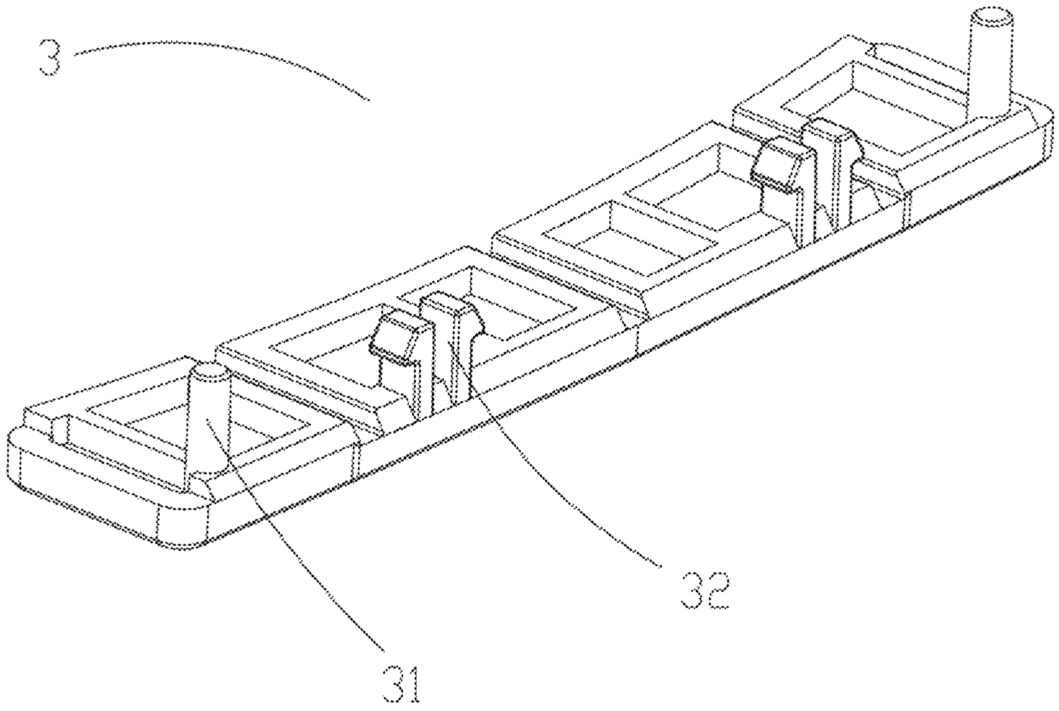
FIG. 6 is a structural diagram of the sliding piece in an embodiment of this disclosure.
Figure 7:
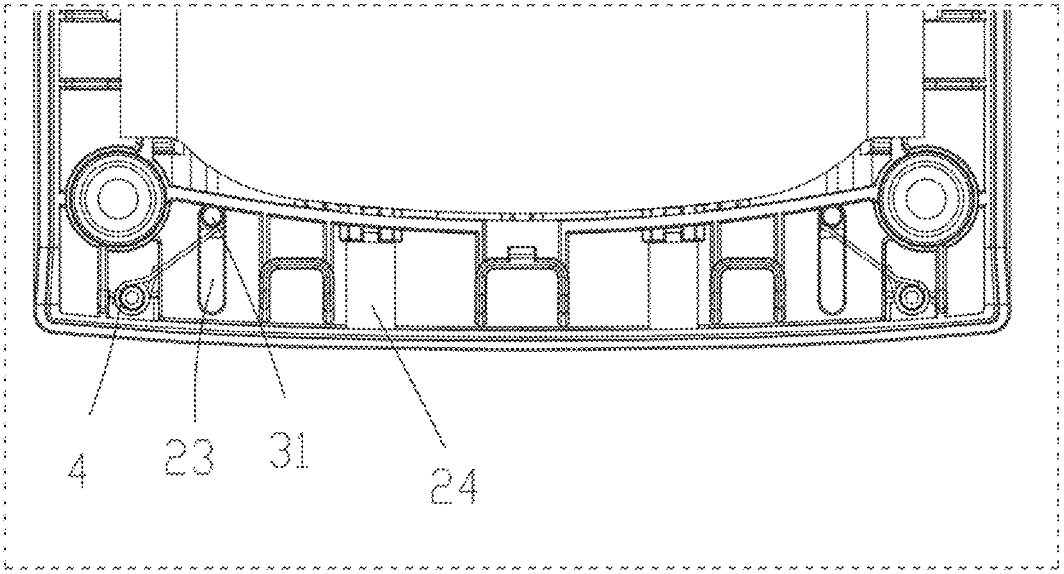
FIG. 7 is a structural diagram of the torsion spring and sliding piece in retracted state in an embodiment of this disclosure.
Figure 8:
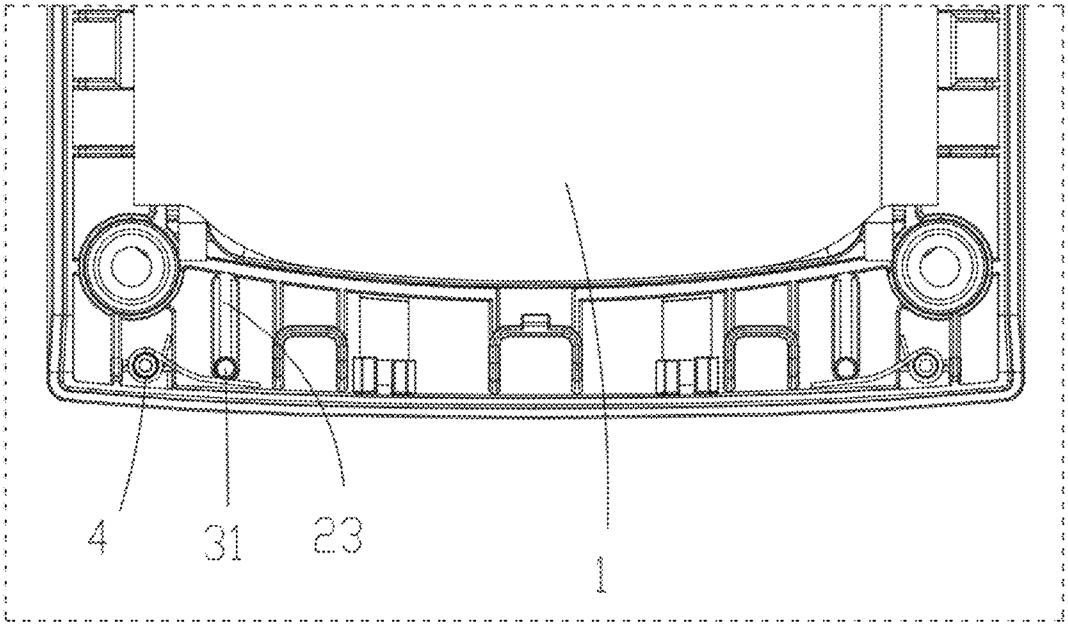
FIG. 8 is a structural diagram of the torsion spring and sliding piece in extended state in an embodiment of this disclosure.

As shown in FIGS. 6 to 8, the sliding piece 3 is provided with a support column 31, the support leg cover 2 is provided with a sliding groove 23 that slidably matches with the support column 31, and the torsion spring 4 abuts against the side of the support column 31 facing away from the support leg 1.

As shown in FIG. 7, taking the left torsion spring 4 as an example, when the support leg 1 is in the retracted state, the torsion spring 4 is in a compressed state with a tendency to rotate counterclockwise, causing the support column 31 to experience an upward elastic force and be pressed against the top of the sliding groove 23, thus covering the rotational gap of the support leg 1. The length direction of the sliding groove 23 is consistent with the front-back direction, allowing the support column 31 to move back and forth within the sliding groove 23, enabling the sliding piece 3 to move back and forth relative to the support leg cover 2, with a simple structure that is stable and reliable.

As shown in FIG. 8, taking the left torsion spring 4 as an example, when the support leg 1 is in the extended state, the sliding piece 3 is pushed by the support leg 1 to the bottom of the sliding groove 23, fixing the sliding piece 3 at the front end position of the support leg cover 2, closely fitting with the front end of the support leg cover 2. At this time, one end of the torsion spring 4 is compressed to the bottom along with the sliding piece 3. When the support leg 1 retracts to the retracted state, the torsion spring 4 provides power for the sliding piece 3 to reset. Under the elastic force of the torsion spring 4, the sliding piece 3 moves upward, returning to its original state.

The torsion spring 4 is ingeniously designed to work with the support leg 1 inside the support leg cover 2 to press the sliding piece 3, thereby adjusting the position of the sliding piece 3. This ensures that the entire structure of the sliding piece 3 is placed inside the support leg cover 2, making it concealed. It does not affect the movement of the support leg 1 or the overall external dimensions, providing users with a good product experience.

As shown in FIGS. 6 to 8, the sliding piece 3 is provided with a locking block 32, the support leg cover 2 is provided with a locking slot 24, and the locking block 32 is slidably engaged in the locking slot 24. The locking block 32 is provided with a guide surface. When installing the sliding piece 3, the guide surface provides guidance, allowing the locking block 32 to smoothly engage in the locking slot 24. When the support column 31 slides in the sliding groove 23, the locking block 32 also slides synchronously in the locking slot 24.

As shown in FIG. 1, the support leg cover 2 includes a top cover 21 and a bottom cover 22, one end of the support leg 1 is embedded inside the bottom cover 22, the sliding piece 3 is installed at the front end of the bottom cover 22, and the top cover 21 is covered on top of the bottom cover 22. The sliding groove 23 and the locking slot 24 are both set at the front end of the bottom cover 22. When the support leg 1 is in the retracted state, it is nearly parallel to the bottom cover 22; when the support leg 1 is in the extended state, it is nearly perpendicular to the bottom cover 22. When the support leg 1 switches from retracted state to extended state, it rotates away from the top cover 21; when the support leg 1 switches from extended state to retracted state, it rotates towards the top cover 21. When the support leg 1 is extended, it presses the sliding piece 3 to the front end of the bottom cover 22 and fits tightly against the inner wall of the bottom cover 22. The top cover 21 covers the bottom cover 22, concealing the internal parts and rotational structure between the support leg covers 2, making it more dust-proof and aesthetically pleasing, while further preventing hand pinching.

Figure 3:
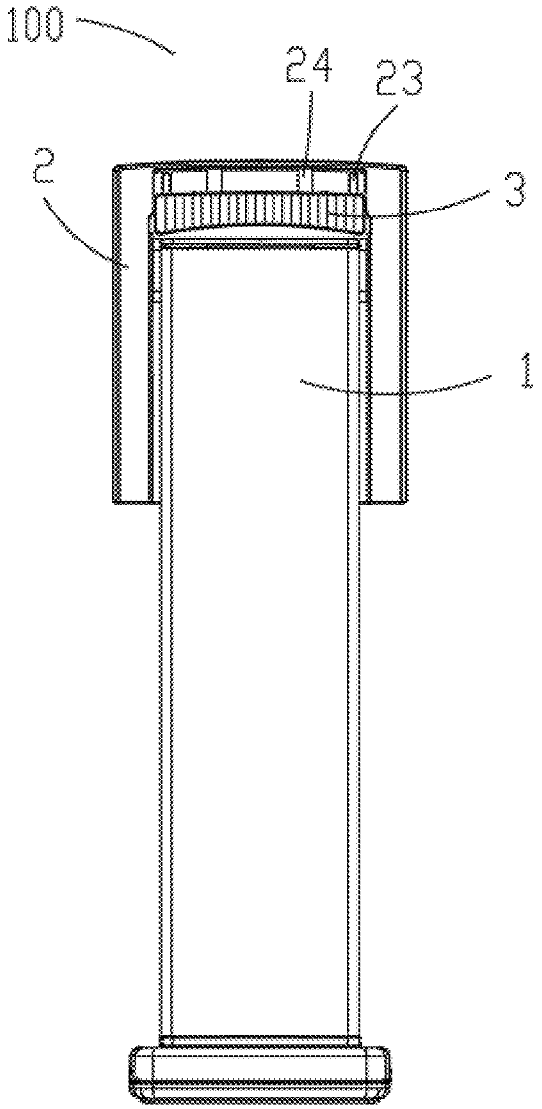
FIG. 3 is a bottom view from one angle of FIG. 2.
Figure 4:
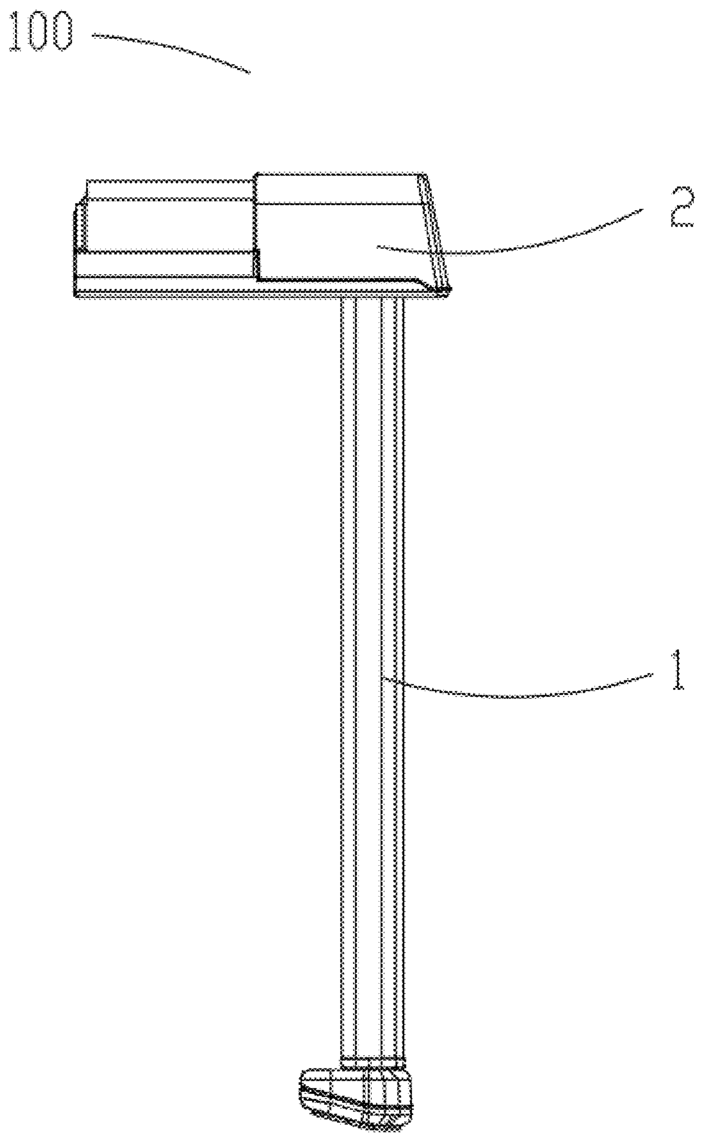
FIG. 4 is a schematic diagram of the support leg in extended state in an embodiment of this disclosure.
Figure 5:
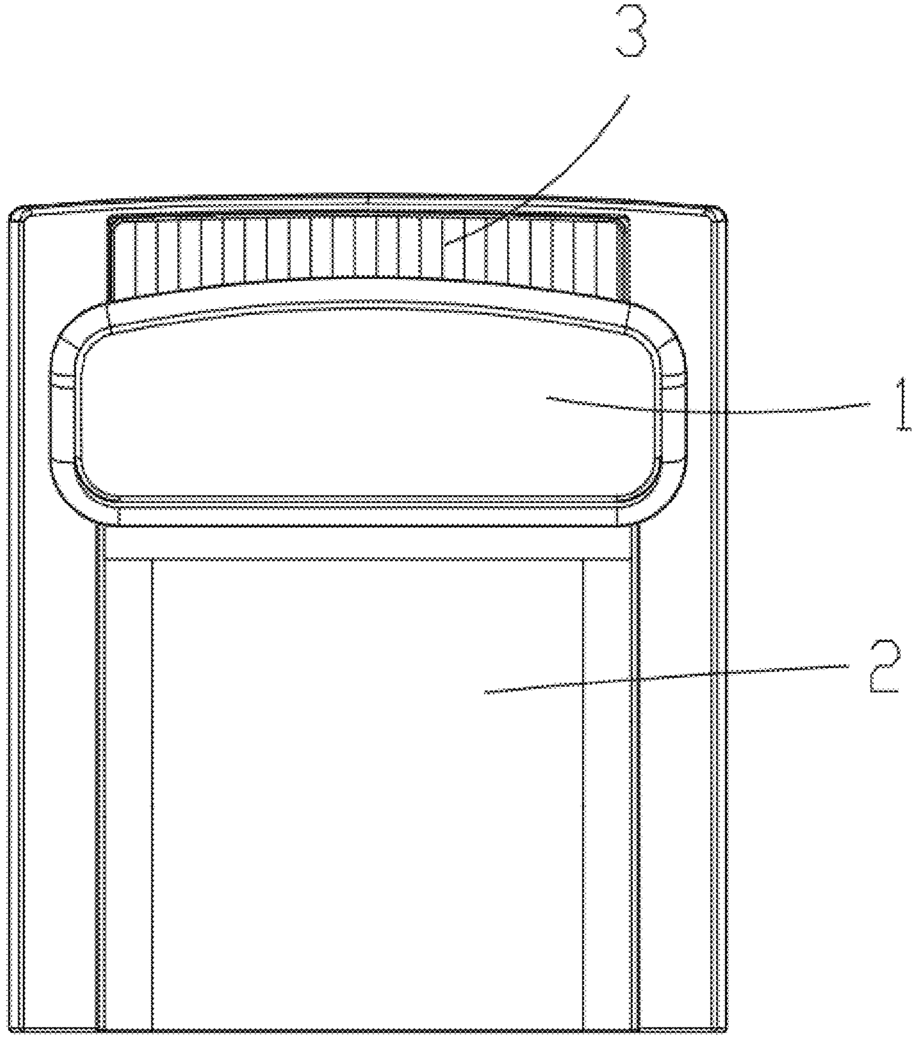
FIG. 5 is a partial bottom view from one angle of FIG. 4.

As shown in FIGS. 3 and 5, the sliding piece 3 is provided with a first guide surface and a second guide surface, the first guide surface matches with the support leg 1, and the second guide surface matches with the support leg cover 2. The first guide surface and the second guide surface are located at opposite ends of the sliding piece 3. When the support leg 1 rotates to the extended state, one end of the sliding piece 3 abuts against the side wall of the support leg 1, with the first guide surface matching the shape of the support leg 1's side wall. When the support leg 1 rotates to the extended state, the other end of the sliding piece 3 abuts against the inner wall of the bottom cover 22, with the second guide surface matching the shape of the bottom cover 22's inner wall.

As shown in FIGS. 3 and 5, the first guide surface is an arc surface. In this embodiment, since the side wall of the support leg 1 is arc-shaped, the first guide surface is an arc surface. This design allows the support leg 1 to rotate more smoothly when pushing the sliding piece 3, avoiding jamming. At the same time, when the support leg 1 is in the extended state, the front side of the support leg 1 completely fits with the first guide surface, preventing users from pinching their hands.

As shown in FIG. 3, the sliding piece 3 is embedded inside the support leg cover. This embedded design allows the sliding piece 3 to be concealed, without affecting the movement of the support leg 1 or the overall external dimensions of the support leg anti-pinch structure 100, providing users with a good product experience.

As shown in FIG. 6, the sliding piece 3 has a symmetrical structure. Two support columns 31 and two locking blocks 32 are symmetrically arranged on the sliding piece 3. The support leg cover 2 is correspondingly provided with two sliding grooves 23 and two locking slots 24. The two torsion springs 4 abut against the lower sides of the two support columns 31 respectively.

Figure 9:
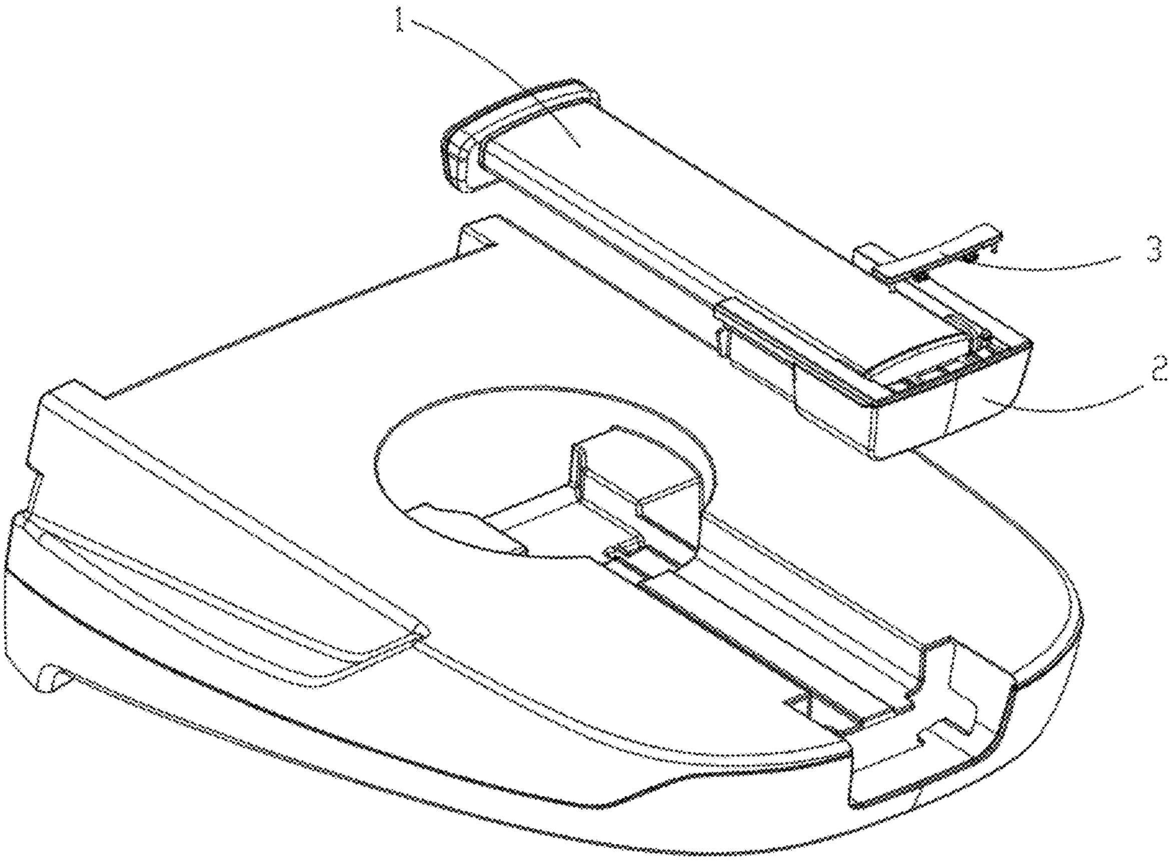
FIG. 9 is a partial exploded view of the support leg anti-pinch structure and child safety seat in an embodiment of this disclosure.

Another embodiment of this disclosure provides a child safety seat, including the support leg anti-pinch structure 100 described above. As shown in FIG. 9, the child safety seat includes a base, and the support leg anti-pinch structure 100 is installed on the base.

Although this disclosure has been described as above, the scope of protection of this disclosure is not limited to this. Those skilled in the art can make various changes and modifications without departing from the spirit and scope of this disclosure, and these changes and modifications will all fall within the scope of protection of this disclosure.

The invention claimed is:

1. A support leg anti-pinch structure, comprising a support leg (1) and a support leg cover (2) rotatably connected to each other, with a sliding piece (3) movably connected between the support leg cover (2) and the support leg (1), wherein when the support leg (1) rotates relative to the support leg cover (2), the sliding piece (3) moves in the front-back direction to cover the rotational gap between the support leg (1) and the support leg cover (2);

wherein the support leg cover (2) is provided with a torsion spring (4), the two ends of the torsion spring (4) are connected to the support leg cover (2) and the sliding piece (3) respectively, and the sliding piece (3) slides relative to the support leg cover (2) under the pressure of the torsion spring (4) and the support leg (1).

2. The support leg anti-pinch structure according to claim 1, wherein the sliding piece (3) is provided with a support column (31), the support leg cover (2) is provided with a sliding groove (23) that slidably matches with the support column (31), and the torsion spring (4) abuts against the side of the support column (31) facing away from the support leg (1).

3. The support leg anti-pinch structure according to claim 2, wherein when the support leg (1) switches from the extended state to the retracted state, the sliding piece (3) separates from the front side of the support leg cover (2) under the action of the torsion spring (4); when the support leg (1) is in the extended state, the sliding piece (3) abuts against the front side of the support leg cover (2) under the pressure of the support leg (1).

4. The support leg anti-pinch structure according to claim 1, wherein the sliding piece (3) is provided with a locking block (32), the support leg cover (2) is provided with a locking slot (24), and the locking block (32) is slidably engaged in the locking slot (24).

5. The support leg anti-pinch structure according to claim 1, wherein the support leg cover (2) includes a top cover (21) and a bottom cover (22), one end of the support leg (1) is embedded inside the bottom cover (22), the sliding piece (3) is installed at the front end of the bottom cover (22), and the top cover (21) is covered on top of the bottom cover (22).

6. The support leg anti-pinch structure according to claim 1, wherein the sliding piece (3) is provided with a first guide surface and a second guide surface, the first guide surface matches with the support leg (1), and the second guide surface matches with the support leg cover (2).

7. The support leg anti-pinch structure according to claim 6, wherein the first guide surface is an arc surface.

8. The support leg anti-pinch structure according to claim 1, wherein the sliding piece (3) is embedded inside the support leg cover (2).

9. The support leg anti-pinch structure according to claim 2, wherein the sliding piece (3) is embedded inside the support leg cover (2).

10. The support leg anti-pinch structure according to claim 3, wherein the sliding piece (3) is embedded inside the support leg cover (2).

11. The support leg anti-pinch structure according to claim 4, wherein the sliding piece (3) is embedded inside the support leg cover (2).

12. The support leg anti-pinch structure according to claim 5, wherein the sliding piece (3) is embedded inside the support leg cover (2).

13. The support leg anti-pinch structure according to claim 6, wherein the sliding piece (3) is embedded inside the support leg cover (2).

14. The support leg anti-pinch structure according to claim 7, wherein the sliding piece (3) is embedded inside the support leg cover (2).

15. A child safety seat, comprising the support leg anti-pinch structure according to claim 1.

16. A child safety seat, comprising the support leg anti-pinch structure according to claim 2.

17. A child safety seat, comprising the support leg anti-pinch structure according to claim 3.

* * * * *